(12) United States Patent
Kim

(10) Patent No.: US 7,542,266 B2
(45) Date of Patent: Jun. 2, 2009

(54) CYLINDRICAL BATTERY

(75) Inventor: Kwang Su Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 367 days.

(21) Appl. No.: 11/410,307

(22) Filed: Apr. 25, 2006

(65) Prior Publication Data

US 2006/0257735 A1 Nov. 16, 2006

(30) Foreign Application Priority Data

Apr. 25, 2005 (KR) .................. 10-2005-0034226

(51) Int. Cl.
*H01G 9/02* (2006.01)

(52) U.S. Cl. ............... 361/512; 361/502; 361/504; 361/508; 361/303; 361/305; 429/129; 429/130; 429/144; 429/145

(58) Field of Classification Search .......... 361/512, 361/523–525, 528–534, 502–504, 508–509, 361/303–305; 429/129–130, 144–145
See application file for complete search history.

(56) References Cited

U.S. PATENT DOCUMENTS

| 4,845,588 | A | * | 7/1989 | Sillner .................. 361/321.6 |
| 5,030,525 | A | * | 7/1991 | Hisatomi et al. ........... 429/101 |
| 5,300,371 | A | * | 4/1994 | Tomantschger et al. ...... 429/60 |
| 5,882,815 | A |   | 3/1999 | Tagawa |
| 6,433,997 | B1 | * | 8/2002 | Noguchi et al. ........... 361/511 |
| 6,703,157 | B1 | * | 3/2004 | Shoji et al. ................. 429/56 |
| 6,869,725 | B2 | * | 3/2005 | Iwanaga et al. ........... 429/130 |
| 2003/0148175 | A1 |   | 8/2003 | Iwanaga et al. |
| 2003/0198863 | A1 |   | 10/2003 | Murashige et al. |

FOREIGN PATENT DOCUMENTS

| JP | 11-144763 | 5/1999 |
| JP | 11-204140 | 7/1999 |
| KR | 10-2003-0043745 | 6/2003 |

* cited by examiner

*Primary Examiner*—Nguyen T Ha
(74) *Attorney, Agent, or Firm*—Lee & Morse P.C.

(57) ABSTRACT

A cylindrical battery including a wound electrode assembly and a center pin disposed in a center space of the electrode assembly, the center pin having a gap along its length, the gap defined by opposing edges of the center pin, wherein at least one of the opposing edges is sloped.

21 Claims, 9 Drawing Sheets

CYLINDRICAL BATTERY

BACKGROUND OF THE INVENTION

1. Field of the Invention

The present invention relates to a cylindrical battery. More particularly, the present invention relates to a cylindrical battery configured to reduce or prevent the possibility of damage arising from externally-applied pressure.

2. Description of the Related Art

Generally, a conventional cylindrical battery may include an electrode assembly formed by winding internal components in a cylindrical shape, a can having a cylindrical shape into which the electrode assembly is inserted, electrolyte injected into the inside of the can for allowing ions to move, and a cap assembly combined with one end of the can to prevent leakage of the electrolyte and separation of the electrode assembly.

Conventional cylindrical batteries may have relatively high capacities, e.g., 2,000-2,400 mA in the case of a lithium ion secondary battery.

Accordingly, they may be installed in devices requiring a large power capacity, e.g., laptop computers, digital cameras, camcorders, etc. For example, a desired number of batteries may be connected in series or parallel, or assembled in a hard pack with a protection circuit to be used as a power supply of the aforementioned electronic devices.

Fabricating a conventional cylindrical battery may include the following operations. First, a negative electrode plate, on which a predetermined activation material layer is formed, a separator, and a positive electrode plate, on which a predetermined activation material layer is formed, may be stacked together. Then, the stack may be combined with a winding axis having a bar shape and wound in a cylindrical shape, thereby forming an electrode assembly. The electrode assembly may be inserted into a cylindrical can, and electrolyte may then be injected. A cap assembly may be welded to the upper portion of the cylindrical can, thereby completing the battery.

In order to prevent deformation of the electrode assembly during charging/discharging the battery, a tubular center pin may be disposed in the center of the electrode assembly. However, the center pin may be deformed or broken down by external pressure. If the center pin is deformed or broken down, the separator in the electrode assembly may also be broken down. This may result in a defect of the separator, which may generate a short circuit between the positive and negative electrode plates and may lead to battery failure or explosion. If the center pin is deformed by external pressure, particularly, lengthwise pressure, the cross-sectional contour of the tubular center pin may become deformed and uneven. Such unevenness of the cross-sectional contour may generate critical breakdowns of the separator.

SUMMARY OF THE INVENTION

The present invention is therefore directed to a cylindrical battery, which substantially overcomes one or more of the problems due to the limitations and disadvantages of the related art.

It is therefore a feature of an embodiment of the present invention to provide a cylindrical battery configured to provide an enhanced margin of safety against internal defects when subjected to external pressure.

It is therefore another feature of an embodiment of the present invention to provide a cylindrical battery having a tubular center pin that is configured to deform in a controlled manner when subjected to a predetermined level of external pressure.

At least one of the above and other features and advantages of the present invention may be realized by providing a cylindrical battery including a wound electrode assembly and a center pin disposed in a center space of the electrode assembly, the center pin having a gap along its length, the gap defined by opposing edges of the center pin, wherein at least one of the opposing edges is sloped.

The at least one opposing edge may be sloped towards an outer surface of the center pin. Each of the opposing edges may be sloped. Virtual extension lines extending from the sloped surfaces of two opposing edges may cross in an inner space of the center pin, and a crossing angle between the extension lines may be greater than or equal to about 60°.

A region of the center pin that is adjacent to the gap may deviate inwards with respect to a circular cross-sectional contour of the center pin.

The region of the center pin that is adjacent to the gap may be substantially flat. The gap may be centered in the substantially flat region. An angle defined by an intersection of an outer surface of the inward-deviating region with a surface of the at least one sloped opposing edge may be greater than or equal to about 120°.

A height of the center pin may be about 90 to about 110% of a height of the electrode assembly. Ends of the center pin may be tapered. The cylindrical battery may be a cylindrical lithium secondary battery.

The wound electrode assembly may include a first electrode plate, a second electrode plate, and a separator interposed between the first and second electrode plates, the wound electrode assembly being wound in a spiral, and the center pin may be disposed against a surface of the second electrode plate.

At least one of the above and other features and advantages of the present invention may also be realized by providing a cylindrical battery including a wound electrode and a center pin disposed in a center space of the electrode assembly, the center pin having a gap along its length, the gap defined by opposing edges of the center pin, wherein a surface of at least one of the opposing edges and an inner surface of center pin define an acute angle.

The acute angle may be less than or equal to about 60°. The acute angle may be within a range of 45° 60°. A region of the center pin that is adjacent to the gap may be bent inwards with respect to a circular cross-sectional contour of the center pin. The bent region may be flat. The gap may be centered in the flat region.

At least one of the above and other features and advantages of the present invention may further be realized by providing a cylindrical battery including a wound electrode, a pin penetrating through a portion of the wound electrode, the pin having a gap formed therein, the pin including an inner surface, an outer surface, a first edge and a second edge, the first edge connecting a first portion of the inner surface to a first portion of the outer surface, the second edge connecting a second portion of the inner surface to a second portion of the outer surface, wherein the gap is defined between the first and second edges and extends from the inner surface to the outer surface, and wherein the gap has a first dimension along the inner surface, the gap has a second dimension along the outer surface, and the first dimension is different from the second dimension.

Each of the inner and outer surfaces of the pin may include a substantially circular portion and a substantially linear portion, the gap may be defined between the substantially linear portions, and the substantially linear portions may extend along a same chord of a circle that is defined by the substantially circular portions.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1A:
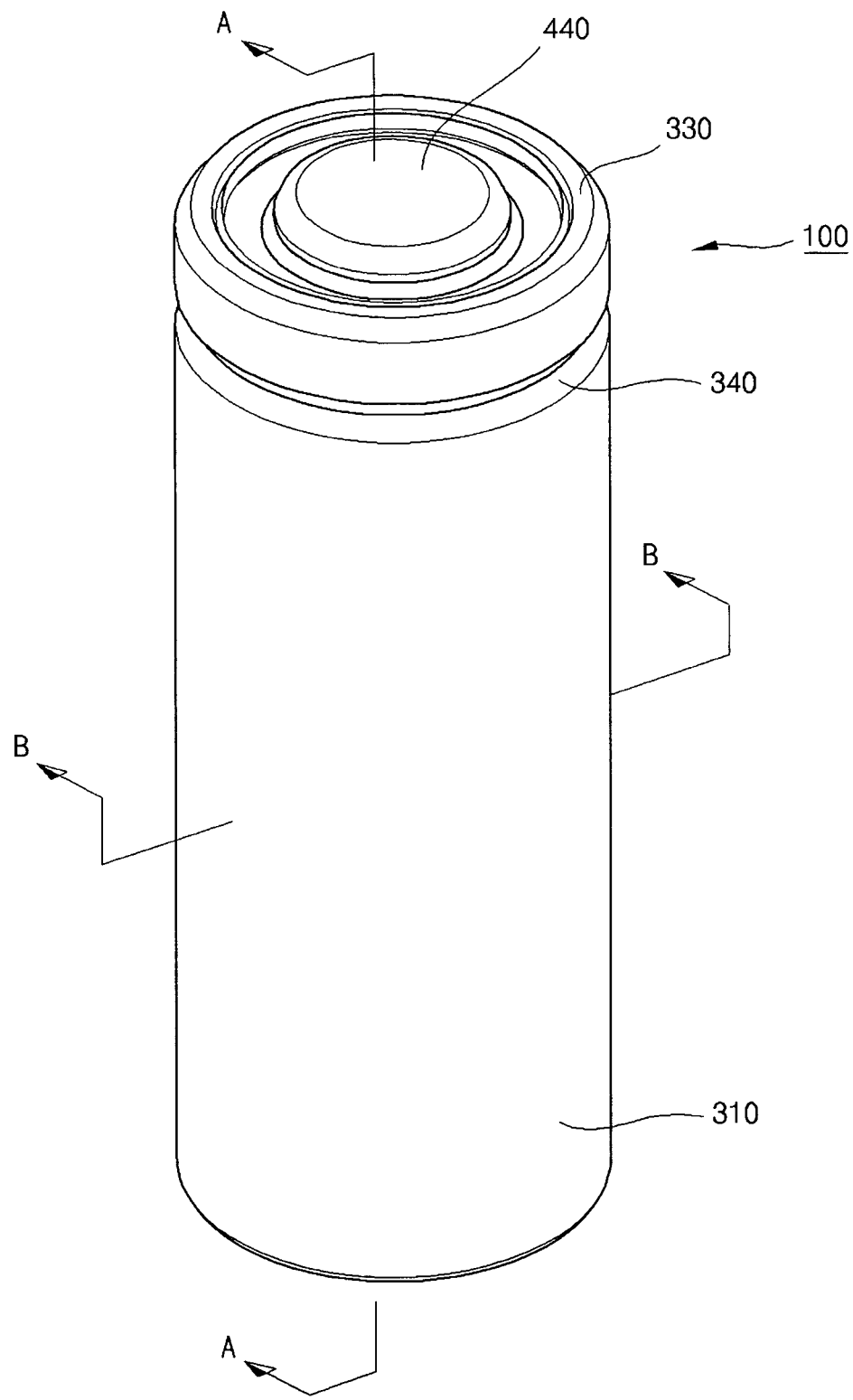
FIG. 1A illustrates a perspective view of a cylindrical battery according to an embodiment of the present invention.

Korean Patent Application No. 10-2005-0034226, filed on Apr. 25, 2005, in the Korean Intellectual Property Office and entitled: "Cylindrical Lithium Secondary Battery," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration.

It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In a cylindrical battery according to an embodiment of the present invention, opposing edges of a center pin, which define a gap, may be pressed inward, towards each other, if the center pin is deformed by a predetermined level of external pressure. Therefore, the resistance of the center pin to external pressure may be enhanced. At least one of the opposing edges may be sloped, in order to provide for controlled deformation of the center pin if it is subjected to external pressure. Thus, it may be possible to prevent breakdown of a separator in an electrode assembly, and a short circuit in the electrode assembly. Therefore, the battery may exhibit an enhanced margin of safety against internal defects when subjected to external pressure. A battery according to the present invention may be particularly suited for use as a cylindrical lithium secondary battery, e.g., a lithium ion battery.

Figure 1B:
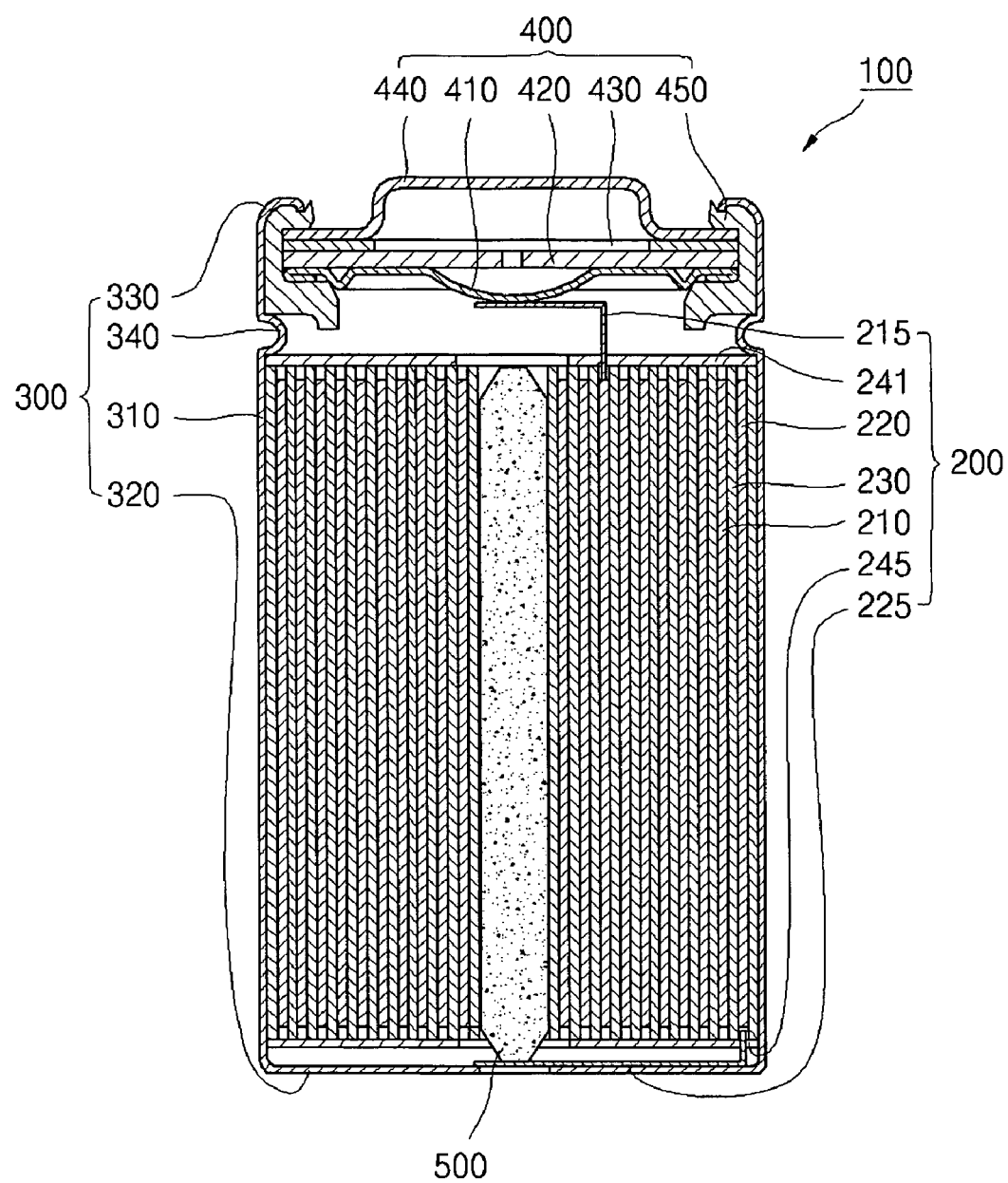
FIG. 1B illustrates a cross-sectional view along a line A-A of FIG. 1A.
Figure 1C:
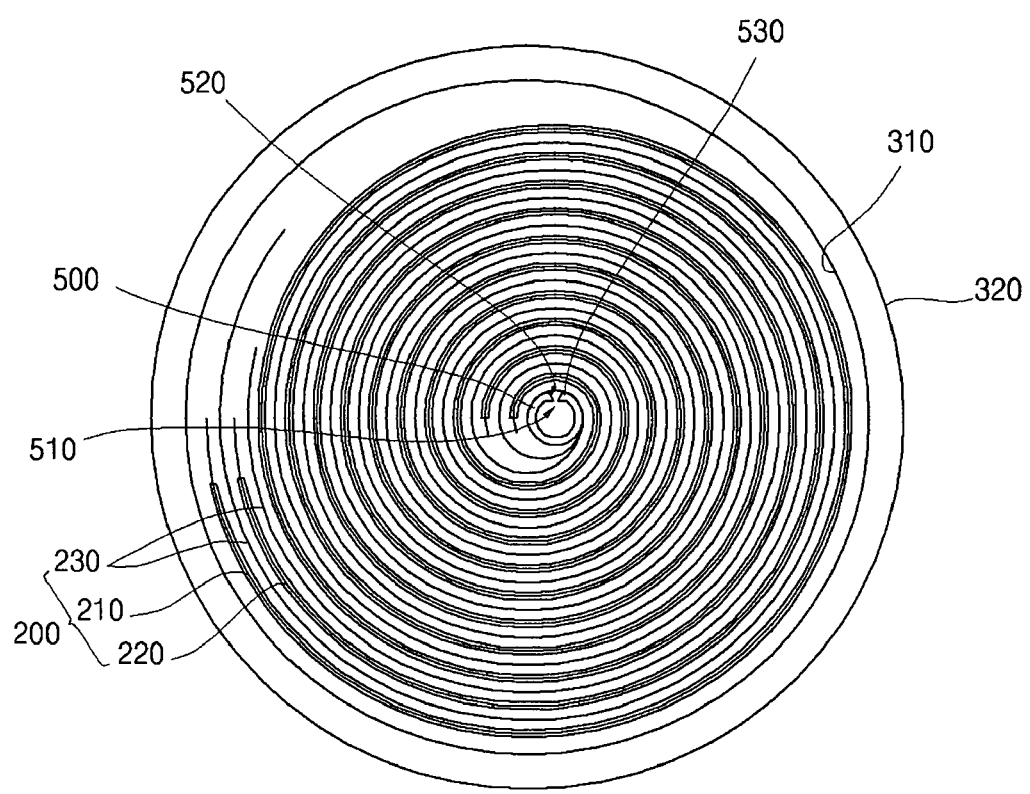
FIG. 1C illustrates a cross-sectional view along a line B-B of FIG. 1A.

FIG. 1A illustrates a perspective view of a cylindrical battery according to an embodiment of the present invention, FIG. 1B illustrates a cross-sectional view along a line A-A of FIG. 1A and FIG. 1C illustrates a cross-sectional view along a line B-B of FIG. 1A. Referring to FIGS. 1A-1C, a cylindrical battery 100 according to an embodiment of the present invention may include an electrode assembly 200 for generating a voltage difference during discharging and/or charging of the cylindrical battery 100, a cylindrical case 300 for housing the electrode assembly 200, a cap assembly 400 which, when combined with the upper portion of the cylindrical case 300, prevents separation of the electrode assembly 200, and a center pin 500 disposed in the center of the electrode assembly.

The electrode assembly 200 may include a first electrode plate 210 on which positive or negative electrode activation materials are coated, e.g., a positive electrode activation material. The electrode assembly 200 may also include a second electrode plate 220 on which the other of the positive and negative electrode activation materials is coated. One or more separators 230 may be interposed between the first electrode plate 210 and the second electrode plate 220 to prevent a short circuit therebetween. The separator 230 may allow ions to move between the first electrode plate 210 and the second electrode plate 220. The first electrode plate 210, the second electrode plate 220 and the separator 230 may be spiral wound in a cylindrical shape and. housed in the cylindrical case 300.

A first electrode tap 215 may be connected to the first electrode plate 210 and may extend toward the cap assembly 400. The first electrode tap 215 may be formed of, e.g., a metal such as aluminum (Al). A second electrode tap 225 may be connected to the second electrode plate 220 and may extend towards the bottom end of the battery 100, i.e., the end that is opposite from the cap assembly 400. The second electrode tap 225 may be formed of, e.g., a metal such as nickel (Ni). An upper insulation plate 241 and a lower insulation plate 245 may be provided at upper and lower ends of the electrode assembly 200, in order to prevent direct contact between the electrode assembly 200, the cap assembly 400 and the cylindrical case 300.

The cylindrical case 300 may have a cylindrical surface 310 having a predetermined diameter and defining an inner space to house the electrode assembly 200. The cylindrical case 300 may also have a lower or bottom surface 320 closing the lower portion of the cylindrical surface 310, while the upper portion of the cylindrical surface 310 may be open, to allow for insertion of the electrode assembly 200. The cylindrical case 300 may be formed of, e.g., a metal such as aluminum, iron, etc., or an alloy of the same.

The first electrode tap 215 or the second electrode tap 225 of the electrode assembly 200, e.g., the second electrode tap 225, may be connected to the center of the lower surface 320 of the cylindrical case 300, so that the cylindrical case 300 itself may function as a terminal having the same polarity as the second electrode plate 220, e.g., a negative terminal.

The cylindrical case 300 may have one or more crimped or rolled features formed therein, for capturing the cap assembly 400. For example, the cylindrical case 300 may include an upper rolled portion 330 at the top of the cylindrical case 300. The upper rolled portion 330 may be formed by deforming a portion of the cylindrical case 300 so that it is bent in a predetermined direction, i.e., towards the center of the cylindrical case 300, for applying downward pressure to the cap assembly 400. The cylindrical case 300 may further include a lower rolled portion 340. The lower rolled portion 340 may be formed by deforming a portion of the cylindrical case 300 inwardly, so that the lower rolled portion is sunken, i.e., protrudes, to the inside of the cylindrical case 300, for applying upward pressure to the cap assembly 400.

The cap assembly 400 may include a conductive safety vent 410 welded to the first electrode tap 215, which may invert to relieve pressure when the battery is overcharged or overheated. The cap assembly 400 may also include a printed circuit board (PCB) 420, which may be electrically and/or mechanically connected to the upper portion of the conductive safety vent 410 and may be switched off if the safety vent 410 is inverted. A thermistor 430 may be electrically and/or mechanically connected to the upper portion of the printed circuit board 420 for switching off the circuitry if the battery overheats or exceeds a predetermined temperature.

A conductive electrode cap 440 may be electrically and mechanically connected to the upper portion of the thermistor 430 to provide electric current generated by the battery to the outside. The electrode cap 440 may be connected to the first electrode tap 215 or the second electrode tap 225, e.g., the first electrode tap 215, to function as a terminal having the same polarity as the first electrode plate 210, e.g., a positive terminal. An insulation gasket 450 may hold and isolate the safety vent 410, the printed circuit board 420, the thermistor 430 and the electrode cap 440, insulating them from the cylindrical case 300.

An electrolyte (not shown) for allowing ions to move in the electrode assembly 200 may be injected into the cylindrical case 300. The electrolyte functions as a medium for transferring ions generated by electrochemical reaction in both the positive and negative electrodes during discharging and/or charging of the battery 100. The electrolyte may be, e.g., a non-aqueous organic electrolyte for transporting lithium ions, e.g., a mixture of lithium salt and highly pure organic solvents. The electrolyte may include a polymer.

Figure 2A:
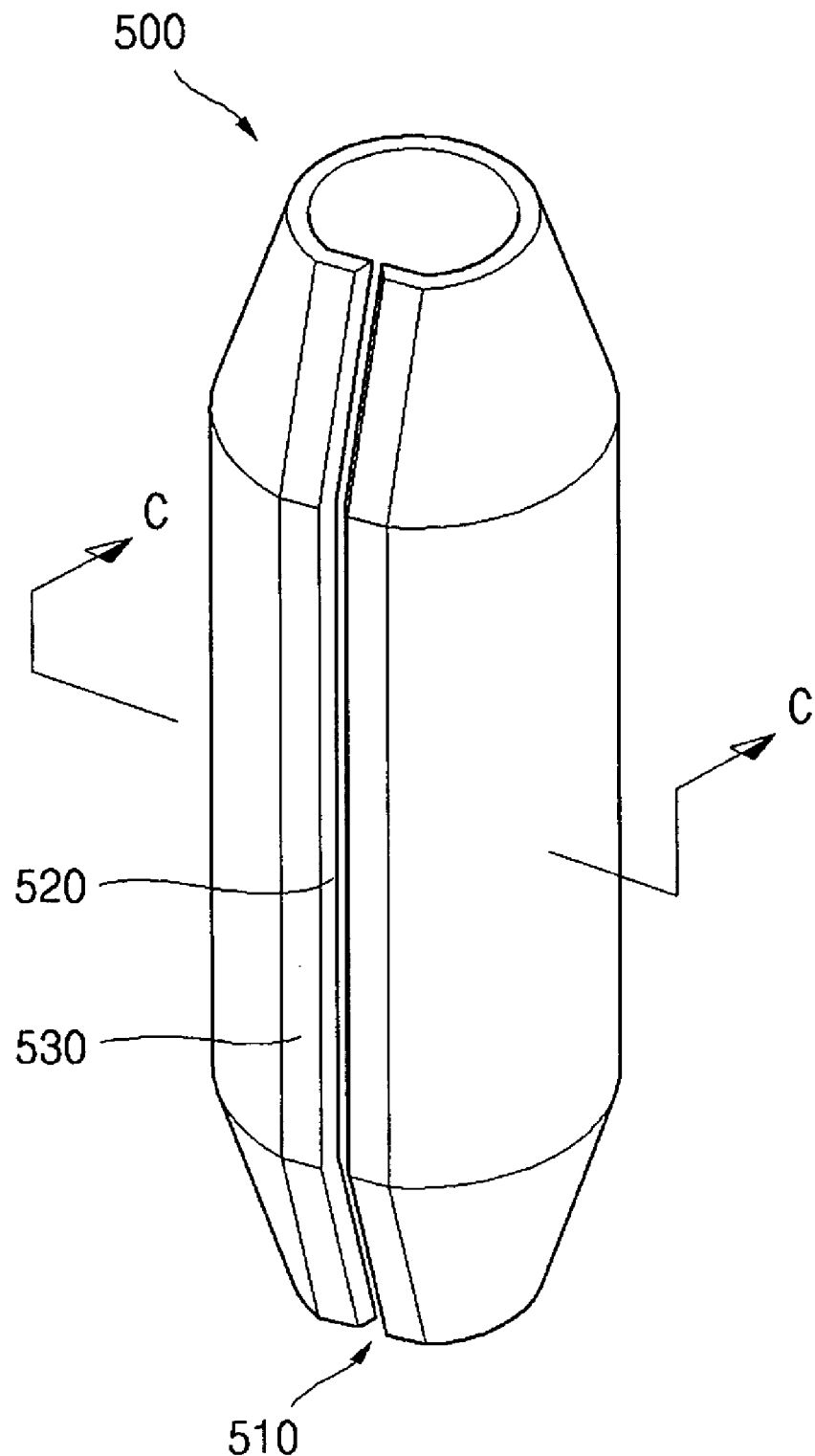
FIG. 2A illustrates a perspective view of a center pin of a cylindrical battery according to an embodiment of the present invention.
Figure 2B:
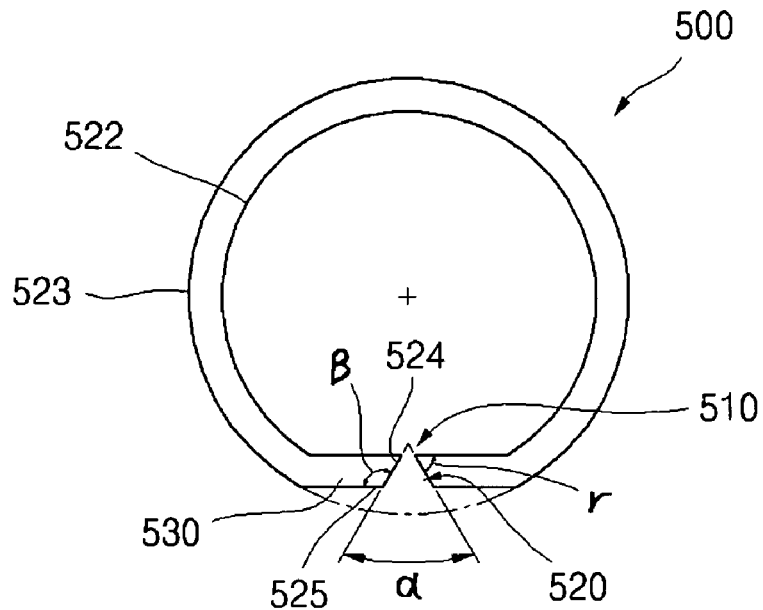
FIG. 2B illustrates a cross-sectional view along a line C-C of FIG. 2A.

FIG. 2A illustrates a perspective view of a center pin of a cylindrical battery according to an embodiment of the present invention, and FIG. 2B illustrates a cross-sectional view along a line C-C of FIG. 2A. Referring to FIGS. 2A and 2B, the center pin 500 may be disposed in a center space of the wound electrode assembly 200 to prevent loosening and deformation of the wound electrode assembly 200, which may be caused by external pressure. The center pin 500 may be generally tubular or annular. The center pin 500 may be substantially hollow. A gap 510 may be formed along a length of the center pin 500. The gap 510 may be defined by opposing edges 520 of the center pin 500.

Upper and lower ends of the center pin 500 may be tapered. The lower end of the center pin 500 may be disposed on the second electrode tap 225. A height of the center pin 500 may be about 90 to about 110% of the height of the electrode assembly 200. If the height of center pin 500 is below 90% of the height of the electrode assembly 200, a force for fixing and supporting the electrode assembly 200 may be weak, while if the height of the center pin 500 is over 110%, the center pin 500 may make contact with components of the cap assembly 300, which may not be desired.

In the assembled battery 100, the opposing edges 520 of the center pin 500, which define the gap 510, may closely confront each other across the gap 510 when the center pin 500 is installed in the electrode assembly 200. The opposing edges 520 may remain separated by a predetermined distance. For example, the width of the gap may be about 0.1 mm to about 5 mm, or may correspond to a central angle of 30°.

As shown in FIG. 2B, each of the opposing edges 520 may connect an inner surface 522 of the center pin 500 to an outer surface 523 of the center pin 500. Each of the opposing edges 520 may include an inner portion 524 and an outer portion 525. Note that, although FIG. 2B illustrates opposing edges 520 that are substantially flat, the opposing edges 520 may have other suitable shapes including, e.g., curves.

A region of the center pin 500 near the opposing edges 520 may deflect or be bent inwards with respect to the circular cross-sectional contour of the center pin 500, such that the region is angled towards the center of the center pin 500. In an implementation, the center pin 500 may have a flattened region 530 that is bent inward and flattened around the gap 510, so that the cross-section of the center pin 500 is flat on both sides of the gap 510, as illustrated at the lower portion of FIG. 2B. In other words, the flattened region 530 may include a first portion on a first side of the gap 510 and a second portion on a second side of the gap 510. For example, the width of the flattened region 530 of the center pin 500 may correspond to a central angle of 60°. Further, as can be seen in FIG. 2B, the first and second portions of the flattened region 530 on either side of the gap 510 may be substantially coplanar. However, the region need not be flat, and other suitable shapes may be employed.

One or more of the opposing edges 520 that define the gap 510 may be sloped. The edge 520 may be sloped towards an outer surface of the center pin, as illustrated in FIGS. 2A and 2B. Alternatively, the edge 520 may be sloped towards an inner surface of the center pin (not shown). In an implementation, each of the opposing edges 520 is sloped. The slope of the sloped surfaces of the opposing edges 520 may be determined with respect to virtual extension lines. The virtual extension lines may meet in the inner space of the center pin 500 and may be angled with respect to each other by an included angle, i.e., a crossing angle, $\alpha$. The crossing angle $\alpha$ of the extension lines of the opposing edges 520 may be greater than or equal to about 60°.

For each of the opposing edges 520, the sloped surface of the edge 520 and the inner surface of the flattened region 530 meet to determine an inner angle $\gamma$. The inner angle $\gamma$ may be an acute angle. In an implementation, the inner angle $\gamma$ may be about 60° or less. In an implementation, the inner angle $\gamma$ may be within a range of about 45° to about 60°. For each of the opposing edges 520, the sloped surface of the edge 520 and the outer surface of the flattened region 530 also determine an outer angle $\beta$. The outer angle $\beta$ may be an obtuse angle. In an implementation, the outer angle $\beta$ may be a complementary angle greater than or equal to about 120°.

As described above, according to the present invention the inner angle $\gamma$ may be about 60° or less and the outer angle $\beta$ may be about 120° or more. Accordingly, a cylindrical battery according to the present invention may be less susceptible to breakdown of the electrode assembly and short circuits, because the flattened region 530 and the sloped opposing edges 520 of the gap 510 are configured to allow the center pin 500 to be deformed toward a predetermined direction when the center pin 500 is deformed by a predetermined level of external pressure. In particular, the center pin 500 may deform inwards, towards the space defined within the center pin 500. That is, the deformation may be controlled to occur in a predetermined direction, i.e., inwards, thus avoiding outward deformation that could deleteriously affect the electrode assembly 200.

If the opposing edges 520 were to bend outward when the center pin 500 is deformed, a portion of the center pin 500 could make contact with the separator 230 of the electrode assembly 200, thereby breaking down the separator 230 and generating a short circuit. In particular, in the case that the opposing edges 520 are close to each other, the opposing edges 520 can come into contact with each other if the inner angle γ is larger than 90° (and the outer angle β is smaller than 90°). The contact between the opposing edges 520 could cause deformation of the center pin 500 to become uncontrolled, thereby increasing the possibility of generating breakdown of the electrode assembly and a short circuit due to an outward deformation of the center pin 500.

In contrast, according to the present invention, the flattened region 530 and the opposing edges 520 are configured to reduce or prevent the likelihood of a short circuit happening as a result of deformation of the center pin 500. In particular, in the case that the opposing edges 520 are close to each other, deformation of the center pin 500 may cause the flattened region 530 to move inward. This motion may alter the relative positioning of the opposing edges 520 so as to reduce the crossing angle α. However, if the inner angle γ and the outer angle β are configured as set forth above, the crossing angle α may remain greater than 0°, so that the opposing edges 520 may remain apart and avoid contact with each other, thereby providing for a controlled deformation that deforms inward, away from the electrode assembly 200.

Figure 3:
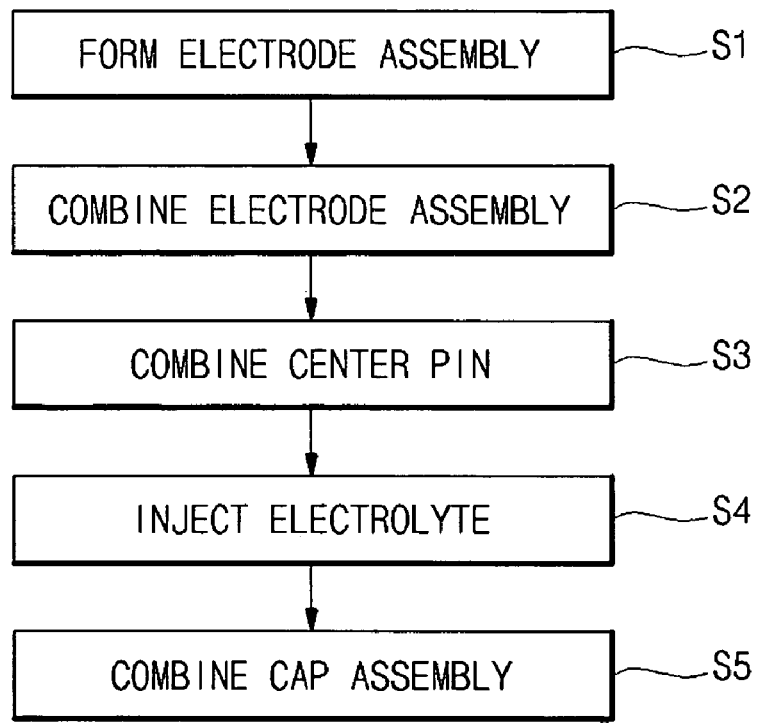
FIG. 3 illustrates a flowchart of a method of fabricating a cylindrical battery according to an embodiment of the present invention.

FIG. 3 illustrates a flowchart of a method of fabricating a cylindrical battery according to an embodiment of the present invention, and FIGS. 4A-4D illustrate stages in a method of fabricating a cylindrical battery according to an embodiment of the present invention. Referring to FIG. 3, a method of fabricating a cylindrical battery according to an embodiment of the present invention may include forming the electrode assembly 200 (S1), combining the electrode assembly 200 (S2), inserting the center pin 500 (S3), injecting electrolyte (S4) and combining the cap assembly 400 (S5).

Figure 4A:
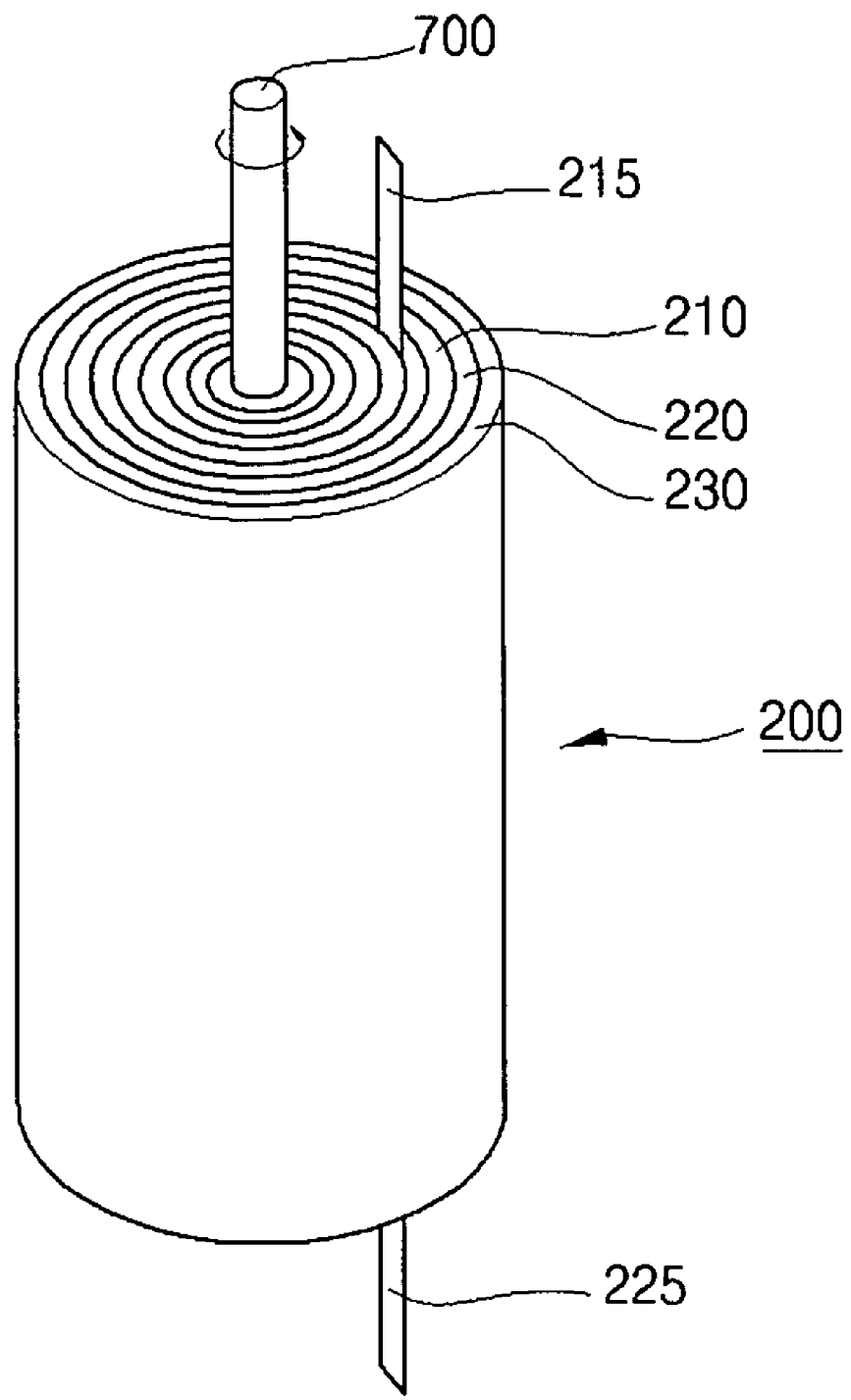
FIGS. 4A-4D illustrate stages in a method of fabricating a cylindrical battery according to an embodiment of the present invention.

Referring to FIGS. 3 and 4A-4D, a method of fabricating a cylindrical battery according to an embodiment of the present invention will now be described. Referring to FIG. 4A, in operation S1, forming the electrode assembly, the first electrode plate 210, the separator 230 and the second electrode plate 220 may be stacked in sequence. Then, a winding axis 700 may be attached to one end of the stack and the electrode assembly 200 may be wound into a cylindrical shape. Before winding the stack, the first electrode tap 215 and the second electrode tap 225 may be attached to the first electrode plate 210 and the second electrode plate 220, respectively.

Figure 4B:
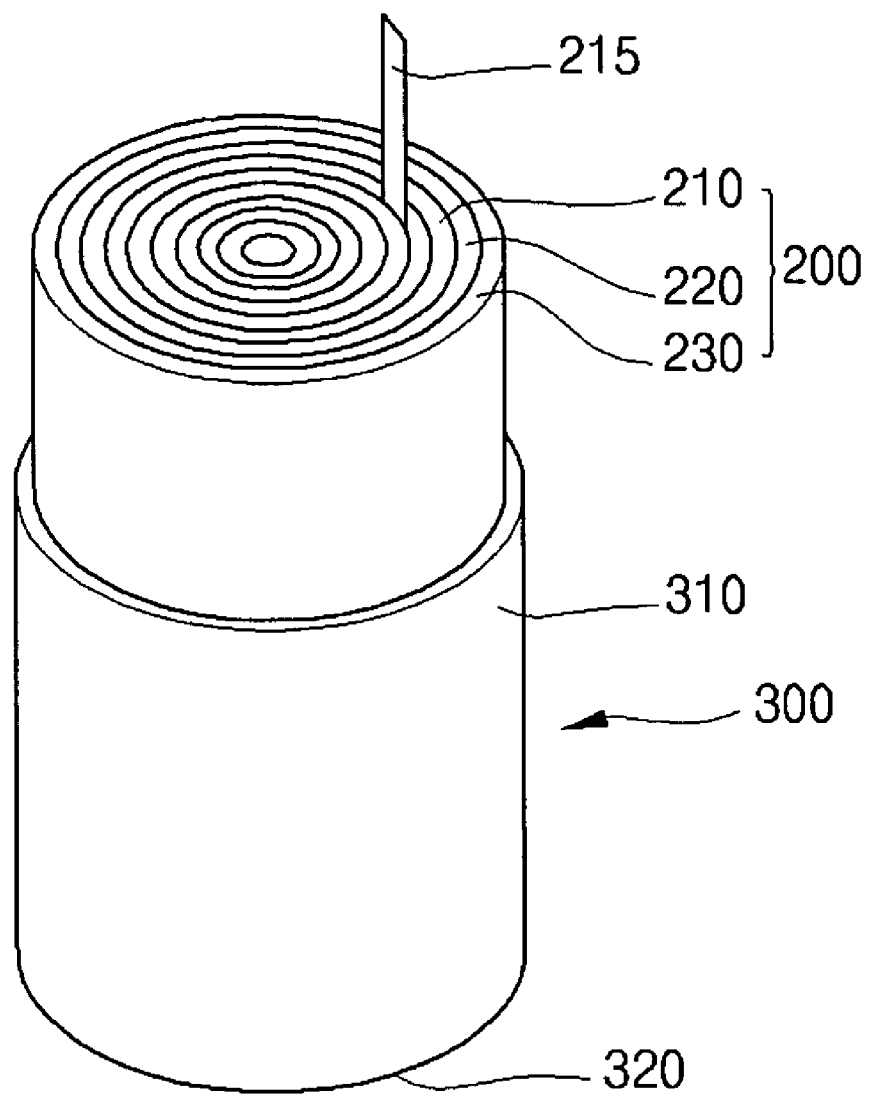

Referring to FIG. 4B, in operation S2, combining the electrode assembly, the electrode assembly 200 may be combined with the cylindrical case 300. The cylindrical case 300 may have first been provided with the lower insulation plate 245 (not shown in FIG. 4B). After combining the electrode assembly 200 with the cylindrical case 300, the winding axis 700 may be separated from the electrode assembly 200. It is noted that the winding axis 700 may be separated before the electrode assembly 200 is combined with the cylindrical case 300, and the present invention is not limited to this particular sequence of operations. The removal of the winding axis 700 may leave a cylindrical space in the center of the electrode assembly 200.

Figure 4C:
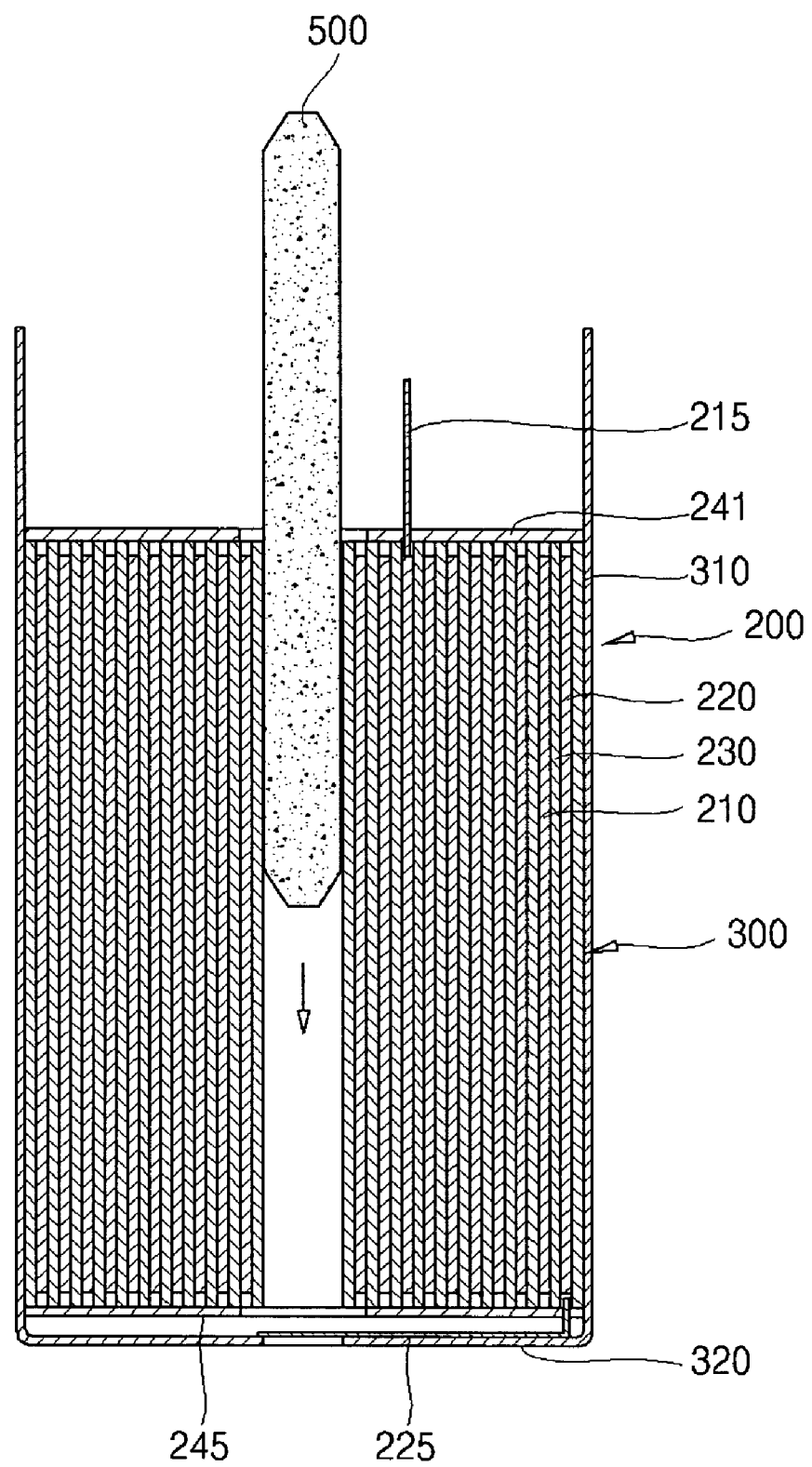

Referring to FIG. 4C, in operation S3, inserting the center pin, the center pin 500 may be inserted into the center space of the electrode assembly that remained after separating the winding axis 700. Before inserting the center pin 500, the first electrode tap 215 or the second electrode tap 225 (e.g., the second electrode tap 225), which may have been previously attached to the electrode assembly 200, may be connected to the bottom surface 320 of the cylindrical case 300, e.g., through welding or the like. Therefore, as shown in FIG. 1B, the center pin 500 may be disposed on the second electrode tap 225 and may be in contact with it. Also, the center pin 500 may serve to reinforce the connection between the second electrode tap 225 and the cylindrical case 300. As described above, the height of the center pin 500 may be about 90-110% of the height of the electrode assembly 200.

In operation S4, injecting electrolyte, the electrolyte may be injected into the electrode assembly 200 until the level of the injected electrolyte reaches the upper end of the electrode assembly 200. The electrolyte allows ions to move in the electrode assembly 200, i.e., between the first electrode plate 210 and the second electrode plate 220, during discharging and/or charging of the battery 100.

Figure 4D:
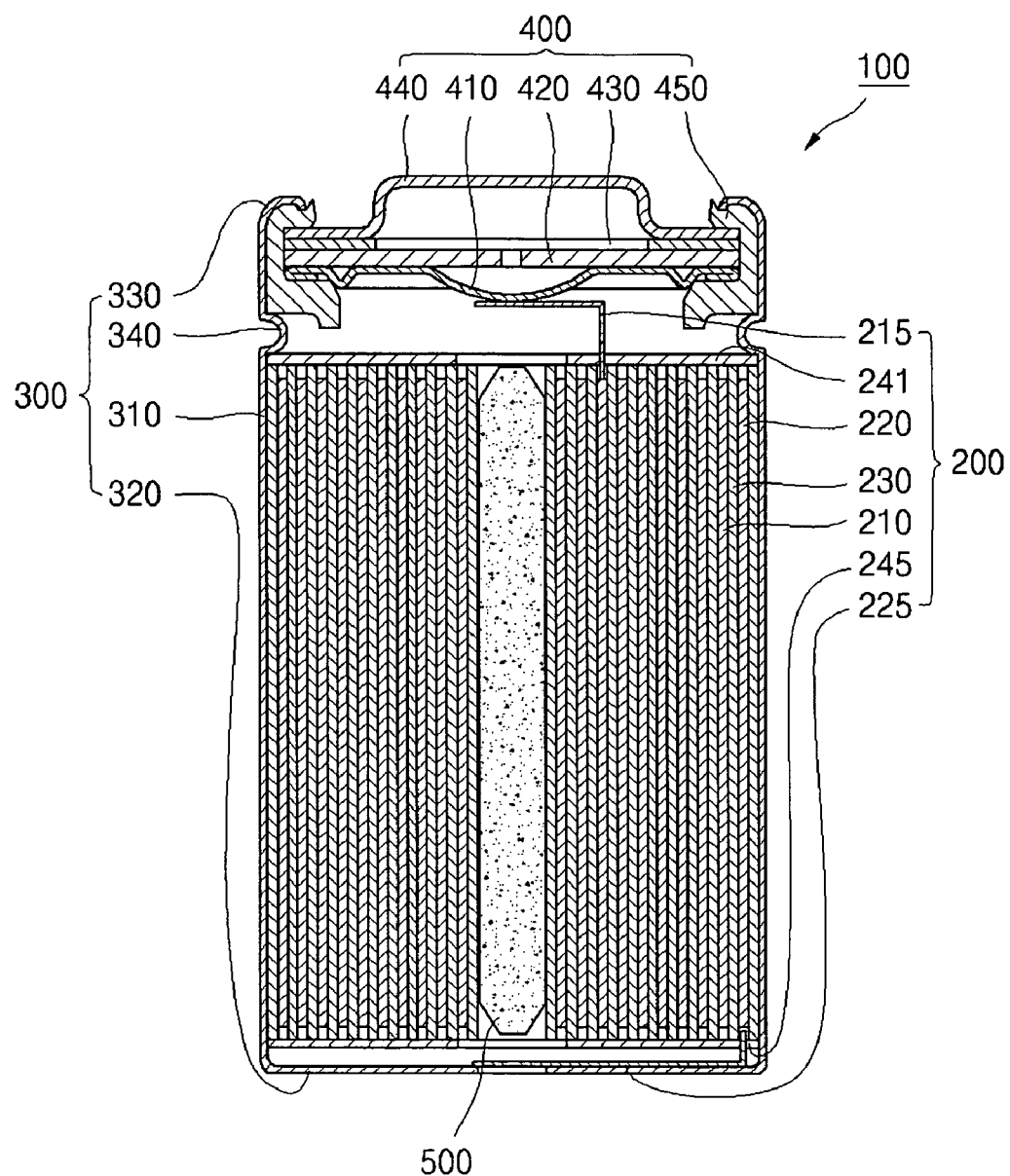

Referring to FIG. 4D, in operation S5, combining the cap assembly, the cap assembly 400, which may include a plurality of components, may be combined with the upper portion of the cylindrical case 300, so that the electrode assembly 200, the center pin 500 and the electrolyte do not separate or leak from the battery 100.

More specifically, an insulation gasket 450, e.g., a ring shaped gasket, may be combined with the upper portion of the cylindrical case 300. Then, a conductive safety vent 410, a printed circuit board 420, a thermistor 430 and an electrode cap 440 may be installed in sequence. The conductive safety vent 410 may be electrically connected to the first electrode tap 215 or the second electrode tap 225 (e.g., the first electrode tap 215), which may have been previously connected to the electrode assembly 200.

Subsequently, an inwardly protruding lower rolled portion 340 protruding to the inside and corresponding to the lower portion of the insulation gasket 450 may be formed by, e.g., rolling a portion of the cylindrical case 300, and an upper rolled portion 330 at the top end of the cylindrical case 300 may be formed by, e.g., crimping, so that the cap assembly 400 may be fixed in place and is not easily separated from the cylindrical case 300.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A cylindrical battery, comprising:
   a wound electrode assembly;
   a center pin disposed in a center space of the wound electrode assembly, the center pin having a gap along a length of the center pin and a region adjacent to the gap, the region following a chord of the circumference of the center pin the gap defined by opposing edges of the region, wherein at least one of the opposing edges are sloped and the opposing edges face each other.

2. The cylindrical battery as claimed in claim 1, where the at least one opposing edge-is sloped towards an outer surface or an inner surface of the center pin.

3. The cylindrical battery as claimed in claim 2, wherein a surface of the at least one opposing edge and the outer surface of the region define an obtuse angle.

4. The cylindrical battery as claimed in claim 3, wherein the obtuse angle is greater than or equal to about 120°.

5. The cylindrical battery as claimed in claim 1, wherein each of the opposing edges are sloped.

6. The cylindrical battery as claimed in claim 5, wherein virtual extension lines extending from the sloped surfaces of two opposing edges cross in an inner space of the center pin, and a crossing angle between the extension lines is greater than or equal to about 60°.

7. The cylindrical battery as claimed in claim 1, wherein the region of the center pin that is adjacent to the gap is substantially flat.

8. The cylindrical battery as claimed in claim 7, wherein a first portion of the region on a first side of the gap and a second portion of the region on a second side of the gap are substantially coplanar.

9. The cylindrical battery as claimed in claim 1, wherein the gap is substantially centered on the chord.

10. The cylindrical battery as claimed in claim 1, wherein a height of the center pin is about 90 to about 110% of a height of the wound electrode assembly.

11. The cylindrical battery as claimed in claim 1, wherein ends of the center pin are tapered.

12. The cylindrical battery as claimed in claim 1, wherein the cylindrical battery is a cylindrical lithium secondary battery.

13. The cylindrical battery as claimed in claim 1, wherein the wound electrode assembly includes a first electrode plate, a second electrode plate, and a separator interposed between the first and second electrode plates, the wound electrode assembly being wound in a spiral, and
the center pin is disposed against a surface of the second electrode plate.

14. A cylindrical battery, comprising:
a wound electrode assembly;
a tubular center pin disposed in a center space of the wound electrode assembly, the tubular center pin having a gap along a length of the tubular center pin and a region adjacent to the gap, the region following a chord of the circumference of the tubular center pin, the gap defined by opposing edges of the tubular center pin, wherein a surface of at least one of the opposing edges and an inner surface of the tubular center pin define an acute angle and the opposing edges are facing each other.

15. The cylindrical battery as claimed in claim 14, wherein the acute angle is less than or equal to about 60°.

16. The cylindrical battery as claimed in claim 14, wherein the acute angle is within a range of 45°-60°.

17. The cylindrical battery as claimed in claim 14, wherein the region is of the tubular center pin is substantially flat.

18. The cylindrical battery as claimed in claim 17, wherein a first portion of the region on a first side of the gap and a second portion of the region on a second side of the gap are substantially coplanar.

19. The cylindrical battery as claimed in claim 14, wherein the gap is substantially centered on the chord.

20. A cylindrical battery, comprising:
a wound electrode;
a pin penetrating through a portion of the wound electrode, the pin having a gap formed therein, the pin including an inner surface, an outer surface, a first edge and a second edge, the first edge connecting a first portion of the inner surface to a first portion of the outer surface, the second edge connecting a second portion of the inner surface to a second portion of the outer surface, wherein the gap is defined between the first and second edges and extends from the inner surface to the outer surface, and wherein:
the gap has a first dimension along the inner surface,
the gap has a second dimension along the outer surface, and
the first dimension is different from the second dimension.

21. The cylindrical battery as claimed in claim 20, wherein each of the inner and outer surfaces of the pin includes a substantially circular portion and a substantially linear portion,
the gap is defined between the substantially linear portions, and
the substantially linear portions extend along a same chord of a circle that is defined by the substantially circular portions.

* * * * *